United States Patent [19]

Nakanishi

[11] Patent Number: 4,723,182
[45] Date of Patent: Feb. 2, 1988

[54] PROTECTIVE ENCLOSURE FOR MAGNETIC RECORDING HEAD ASSEMBLY

[75] Inventor: Yasuyuki Nakanishi, Nagaokakyo, Japan

[73] Assignee: Mitsubishi Denki Kabushiki, Tokyo, Japan

[21] Appl. No.: 890,340

[22] Filed: Jul. 29, 1986

[30] Foreign Application Priority Data

Aug. 6, 1985 [JP] Japan .................. 60-121711[U]

[51] Int. Cl.⁴ ............................................. G11B 5/027
[52] U.S. Cl. .......................................... 360/85; 360/95
[58] Field of Search .............. 360/85, 95, 84, 93, 360/129, 137

[56] References Cited

U.S. PATENT DOCUMENTS

Re. 29,999  5/1979  Hisota .................................. 360/84
4,126,888  11/1978  Hayashi et al. ..................... 360/85
4,611,255   9/1986  Ushiro et al. ....................... 360/84

Primary Examiner—Stuart N. Hecker
Assistant Examiner—David J. Severin
Attorney, Agent, or Firm—Birch, Stewart, Kolasch & Birch

[57] ABSTRACT

A magnetic tape recording and/or reproducing apparatus which comprises a cylindrical drum assembly for the support of at least one magnetic recording and/or reproducing head for rotation about the longitudinal axis thereof, a pair of guide posts supported for movement between retracted and operative position and operable to turn a length of magnetic tape, which is drawn out from a tape cassette when the guide posts are held at the retracted position, around a portion of the cylindrical drum assembly when the guide posts are moved to the operative position, a protective enclosure enclosing the cylindrical drum assembly for protecting it from dust and foreign matter, and a drive unit for selectively opening and closing the enclosure.

7 Claims, 9 Drawing Figures

PROTECTIVE ENCLOSURE FOR MAGNETIC RECORDING HEAD ASSEMBLY

BACKGROUND OF THE INVENTION

The present invention generally relates to a magnetic tape recording and/or reproducing apparatus such as, for example, a video tape recorder (VTR) or digital audio tape recorder (DAT) being capable of information recording and/or reproducing on and from a reeled length of magnetic tape. More particularly, the present invention relates to a protective enclosure for a magnetic recording and/or reproducing head assembly used in the magnetic tape recording and/or reproducing apparatus.

Figure 8:
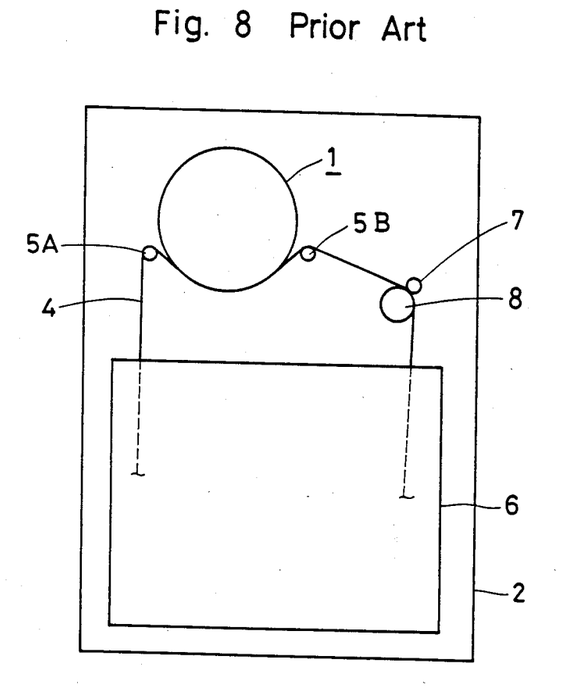
FIG. 8 is a top plan view of the prior art cylindrical drum assembly shown together with the tape cassette.
Figure 9:
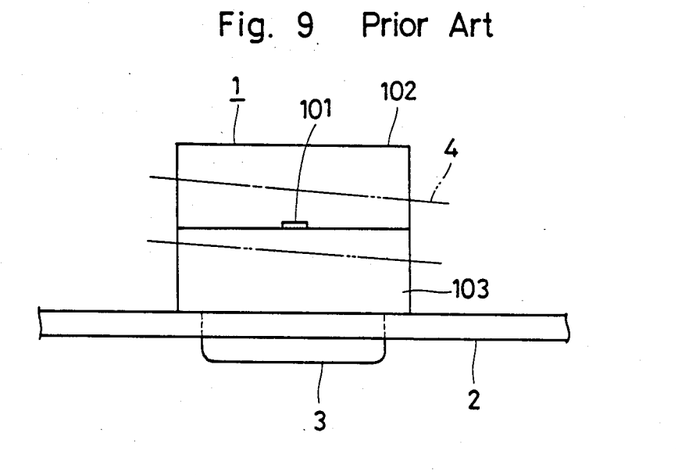
FIG. 9 is a front elevational view of the prior art cylindrical drum assembly shown in FIG. 8.

As is well known to those skilled in the art, and as shown in FIGS. 8 and 9 of the accompanying drawings which illustrate a video tape recorder in schematic top plan view and front elevational view, respectively, the conventional video tape recorder makes use of a magnetic recording and/or reproducing head assembly (hereinafter, simply referred to as "magnetic head assembly") which comprises a cylindrical drum assembly 1. The cylindrical drum assembly 1 comprises a stationary drum 103 rigidly mounted on a base plate 2, and a rotary drum 102 mounted atop the stationary drum 103 in coaxial relationship with said stationary drum 103 and carrying at least one magnetic recording and/or reproducing head 101 for rotation together therewith at a position adjacent the stationary drum 103, said rotary drum 102 being supported by and drivingly coupled with a drive shaft of an electric drive motor 3 that is carried by the stationary drum 103.

A length of magnetic tape 4 drawn out from a standardized tape cassette 6 loaded in a cassette chamber in the apparatus extends from a supply reel (not shown) within the tape cassette 6 to a take-up reel (not shown) also within the tape cassette 6, having been deflected by a leading guide post 5A so as to contact a portion of the cylindrical drum assembly 1. The tape 4 is then deflected again by a trailing guide post 5B and finally passed between a capstan 7 and a pinch roller 8. The capstan 7 is drivingly coupled with a separate drive motor or the same drive motor 3 through a reduction gear unit, and therefore, during the rotation of the capstan 7 in one direction, the length of magnetic tape 4 can be pulled from the supply reel onto the take-up reel while sandwiched between it and the pinch roller 8.

In practice, the leading and trailing guide posts 5A and 5B are supported for movement between retracted and operative positions and are normally held at the retracted position when and so long as the tape cassette 6 is not inserted into the cassette chamber. However, when the tape cassette is inserted into the cassette chamber and subsequently assumes a loaded position within the cassette chamber, the leading and trailing guide posts 5A and 5B in the retracted position protrude into a recess, defined at the front side of the tape cassette, and, as they move towards the operative position, pull a length of magnetic tape 4 towards the cylindrical drum assembly 1. With the leading and trailing guide posts 5A and 5B brought to the operative position as shown in FIG. 8, a portion of the magnetic tape 4 between the leading and trailing guide posts 5A and 5B is held in contact with that portion of the outer peripheral surface of the cylindrical drum assembly 1 and extends at a predetermined angle relative to the plane in which the magnetic recording and/or reproducing head 101 revolves together with the rotation of the rotary drum 102. This is well known as a helical scan system.

As a matter of design well known to those skilled in the art, during the actual information recording or reproduction with the head 101 scanning helically the length of magnetic tape 4 being moved from the supply reel onto the take-up reel, the rotary drum 102 carrying the head 101 is driven by the motor 3 at a high velocity relative to the speed of travel of the length of magnetic tape 4.

According to the prior art video tape recorder of the construction as hereinabove described, the cylindrical drum assembly 1 is left bared, that is, unprotected from dust and foreign matter within the cabinet of the magnetic tape recording and/or reproducing apparatus. Therefore, when the magnetic tape recording and/or reproducing apparatus is placed in the environment full of dust and foreign matter, for example, placed or installed in an automobile, dust and foreign matter are readily accessible into the cabinet of the apparatus, adhering to the outer peripheral surface of the cylindrical drum assembly 1. Once this happens, a detrimental problem occurs not only to the apparatus as a whole, but also to the magnetic tape. More specifically, if the cylindrical drum assembly is contaminated with the dust and the foreign matter, both of the length of magnetic tape 4 and the magnetic recording and/or reproducing head 101 are susceptible to abrasive wear which ultimately results in the failure of the both to exhibit their designed performance.

Moreover, where the prior art magnetic tape recording and/or reproducing apparatus of the type described hereinabove is placed or installed in the environment where a change in ambient temperature is pronounced, for example, during the winter season while the apparatus is positioned adjacent an air-conditioner grille inside an automobile, hot air emerging from the air-conditioner grille enters the cabinet of the apparatus and, as a result of the contact of the hot air with the peripheral surface of the cylindrical drum assembly which is still cool, the frosting takes place in the peripheral surface of the cylindrical drum assembly. Once the peripheral surface of the cylindrical drum assembly is frosted, that portion of the magnetic tape which has been turned around a portion of the outer peripheral surface of the cylindrical drum assembly sticks more or less to the outer peripheral surface of the cylindrical drum assembly with the result that proper movement of the magnetic tape is hampered to such an extent as to result in the entanglement of the magnetic tape inside the cabinet.

SUMMARY OF THE INVENTION

The present invention has been devised aiming at substantially eliminating the above discussed problems inherent in the prior art magnetic tape recording and/or reproducing apparatus, which is hereinafter referred to as "magnetic tape player", resulting from the use of the unprotected cylindrical drum assembly, and has for its essential object to provide an improved magnetic tape player wherein the cylindrical drum assembly for the support of the magnetic recording and/or reproducing head is protected from dust and foreign matter and also substantially from adverse influences which may be brought about by the change in ambient temperature.

Another important object of the present invention is to provide an improved magnetic tape player of the type referred to above, wherein the occurrence of abrasive contact between the length of magnetic tape and the peripheral surface of the cylindrical drum assembly is minimized even though the magnetic tape player is used in the obnoxious environment.

A further object of the present invention is to provide an improved magnetic tape player of the type referred to above, which can be manufactured with the use of the existing factory facilities without incurring an unreasonable increase in manufacturing cost.

In order to accomplish these objects, the present invention provides a magnetic tape player which comprises a cylindrical drum assembly including a stationary drum, rigidly mounted on a base plate, and a rotary drum rotatably mounted atop the stationary drum and carrying at least one magnetic recording and/or reproducing head for rotation together therewith; means supported for movement between retracted and operative positions and operable to turn a length of magnetic tape, drawn out from a tape container when said means is held at the retracted position, around a portion of the cylindrical drum assembly when said means is moved to the operative position; a protective enclosure enclosing the cylindrical drum assembly; and a gating means operable to open the protective enclosure, when said means for turning the length of magnetic tape around that portion of the cylindrical drum assembly approaches the operative position, to permit at least said portion of the cylindrical drum assembly to be exposed to the outside, and also to close the protective enclosure when said means for turning the length of magnetic tape moves away from the operative position towards the retracted position.

Thus, according to the present invention, that portion of the cylindrical drum assembly around which the length of magnetic tape is turned in readiness for information recording or reproduction is exposed to provide an access to the length of magnetic tape only when so required, that is, only when the length of magnetic tape is required to be turned therearound. Other than when the length of magnetic tape is to be turned around the cylindrical drum assembly, the latter is enclosed within the enclosure substantially completely, and accordingly, the cylindrical drum assembly as a whole can advantageously be protected from any possible entry and adherence of dust and foreign matter which would otherwise constitute a cause of abrasive relative movement between the magnetic tape and the outer peripheral surface of the cylindrical drum assembly.

Preferably, the enclosure is in the form of a cylindrical cap having a volume sufficient to accommodate the cylindrical drum assembly therein and comprised of a stationary shroud and a movable shroud. The movable shroud is supported relative to the stationary shroud for movement between an opened and a closed position and is moveable in association with the movement of the means for turning the length of magnetic tape.

These and other objects and features of the present invention will be readily understood from the following detailed description of the present invention taken with reference to the accompanying drawings which illustrates a preferred embodiment thereof by way of example.

BRIEF DESCRIPTION OF THE ACCOMPANYING DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Before the detailed description of the preferred embodiment of the present invention proceeds, it is to be noted that like parts are designated by like reference numerals throughout the several views of the accompanying drawings.

Referring first to FIGS. 1 to 4, the cylindrical drum assembly utilized in the practice of the present invention may be of any known construction and is, therefore, similar to that shown in and with reference to FIG. 9. Accordingly, the details thereof are not herein reiterated for the sake of brevity. It should be noted, however, that the cylindrical drum assembly shown and described is the one generally used in a video tape recorder.

In accordance with the present invention, the cylindrical drum assembly 1 comprised of the stationary and movable drums 103 and 102 and at least one information recording and/or reproducing head 101 carried by the movable drum 102 for rotation together therewith and mounted on the base plate 2 is encased within a generally cylindrical enclosure generally identified by X. This enclosure X comprises a stationary shroud 901, rigidly mounted on the base plate 2, and a movable shroud 902 mounted on the base plate 2 for movement between opened and closed positions relative to the stationary shroud 901.

As is well known to those skilled in the art, in any one of the known video tape recorder, not all of the outer peripheral surface of the cylindrical drum assembly 1 is utilized, and the length of magnetic tape 4 drawn out of the tape cassette 6 is designed to run from the supply reel towards the take-up reel in sliding contact with only portion of the outer peripheral surface of the cylindrical drum, which portion generally extends approximately 180° about the axis of rotation of the rotary drum 102. While that portion of the outer peripheral surface of the cylindrical drum assembly 1 is referred to as an "operative surface area" of the cylindrical drum assembly, the stationary shroud 901 is so positioned on the base plate 2 as to cover the remaining portion of the outer peripheral surface of the cylindrical drum assembly 1 which is hereinafter referred to as a "non-operative surface area". So far shown, the operating surface area of the cylindrical drum assembly 2 confronts the tape cassette 6, but this design feature is not essential to the present invention.

Each of the stationary and movable shroud 901 and 902 comprises a curved wall 901a or 902a so curved as to follow the curvature of the cylindrical drum assembly 1, and a generally semi-circular top wall 901b or 902b integrally formed with, or otherwise welded to, the curved wall 901a or 902a so as to render the respective shroud 901 or 902 to represent a shape similar to the shape of a cylidrical cap cut into halves along the longitudinal axis thereof. It is, however, to be noted that the stationary shroud 901 is undersized as compared with the movable shroud 902 to permit the stationary and movable shrouds 901 and 902 to overlap with each other when the movable shroud 902 is moved to the opened position as shown in FIGS. 1 and 4.

Figure 1:
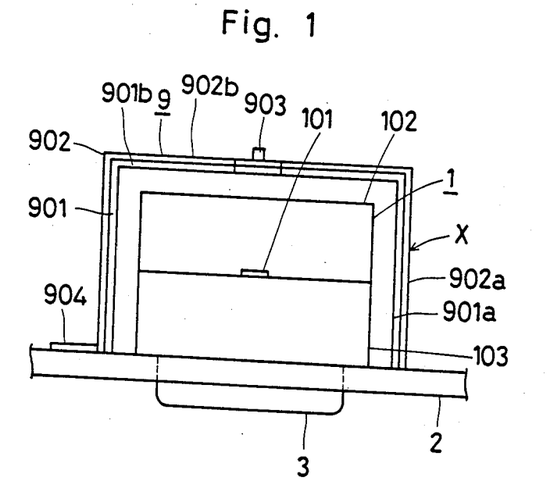
FIG. 1 is a front elevational view of a cylindrical drum assembly embodying the present invention, with a movable shroud held in an opened position.
Figure 4:
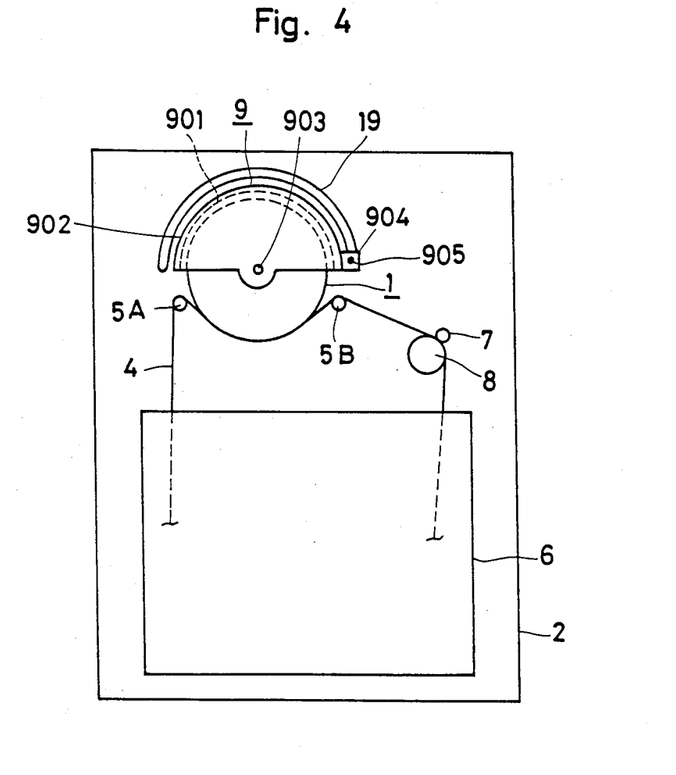
FIG. 4 is a view similar to FIG. 2, showing the movable shroud being moved to the opened position.

As best shown in FIGS. 1 and 4, when and so long as the movable shroud 902 is in the opened position, the operative surface area of the cylindrical drum assembly 1 is exposed to the outside of the enclosure X, particularly, towards the tape cassette 6 as shown. For this purpose, the stationary and movable shrouds 901 and 902 are relatively pivotably connected together by means of a pivot pin 903 so positioned as to align with the longitudinal axis of the cylindrical drum assembly 1 or the axis of rotation of the rotary drum 102. Therefore, the movable shroud 902 is movable between the closed and opened positions about the longitudinal axis of the pivot pin 903.

For moving the movable shroud 902 between the closed and opened positions, the movable shroud 902 has an engagement lug 904 integrally formed therewith, or rigidly secured thereto, so as to protrude laterally outwardly from a lower end of the curved wall 902 adjacent the base plate 2, which engagement lug 904 is drivingly connected through a linkage system, as will be described later, with a drive mechanism for driving the guide posts 5A and 5B selectively between the retracted and operative positions.

Figure 2:
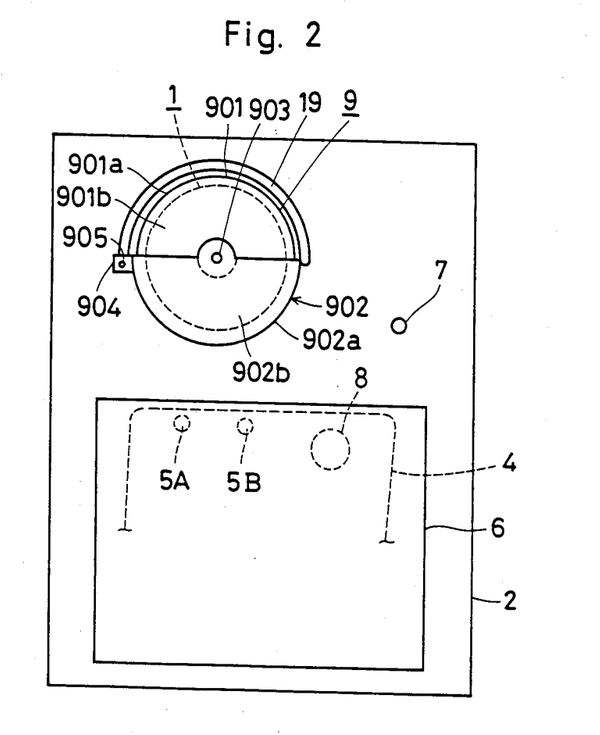
FIG. 2 is a top plan view, on a somewhat reduced scale, of the cylindrical drum assembly with the movable shroud held in a closed position, shown together with a tape cassette.

In the construction so far described, when and so long as the length of magnetic tape need not be drawn out from the tape cassette 6 and the guide posts 5A and 5B are, therefore, held at the retracted position as shown in FIG. 2, the movable shroud 902 is in the closed position, enclosing the cylindrical drum assembly 2 substantially completely in cooperation with the stationary shroud 901. In this condition, neither the operative surface area nor the non-operative surface area of the cylindrical drum assembly 1 are exposed to the outside. No annular portion of the base plate 2 exteriorly around the cylindrical drum assembly 1 and inside the enclosure X is perforated and, therefore, the cylindrical drum assembly 1 can be substantially completely concealed.

Figure 3:
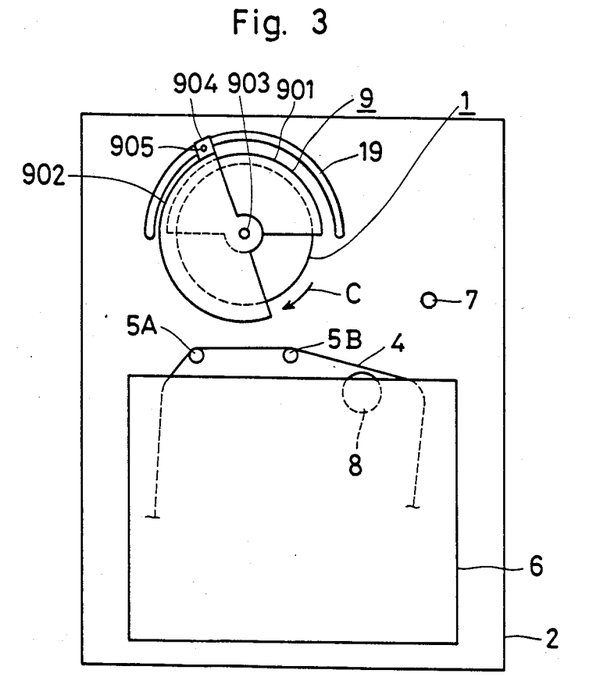
FIG. 3 is a view similar to FIG. 2, showing the movable shroud being moved from the closed position towards the opened position.

Assuming, however, that the guide posts 5A and 5B are being moved from the retracted position towards the operative position in readiness for the length of magnetic tape 4 to be turned around the operative surface area of the cylindrical drum assembly 1 as shown in FIG. 3, the movable shroud 902 is pivoted from the closed position towards the opened position in a direction C clockwise about the pivot pin 903 as viewed in FIG. 3 with the operative surface area of the cylindrical drum assembly 1 being progressively exposed to the outside. Upon the subsequent arrival of the guide posts 5A and 5B at the operative position as shown in FIG. 4, the movable shroud 902 is pivoted about 180° about the pivot pin 903 to the opened position and the length of magnetic tape 4 is turned around the operative surface area of the cylindrical drum assembly 1.

Where the length of magnetic tape 4 turned around the operative surface area of the cylindrical drum assembly 1 is desired to be accommodated within the tape cassette 6 and the guide posts 5A and 5B therefore, are moved from the operative position back towards the retracted position, the movable shroud 902 in the opened position is pivoted counterclockwise in a manner reverse to that described hereinabove.

While the linkage system for enabling the movable shroud 902 to move between the closed and opened positions in response to the movement of the guide posts 5A and 5B will now be described with particular reference to FIGS. 5 to 7, it is to be noted that the present invention is not always limited to the use of the linkage system, but may employ a separate drive mechanism apart from that used for driving the guide posts 5A and 5B. Where this separate drive mechanism, for example, an electrically operated motor, is employed, it may be possible to make the movable shroud 902 move in response to an electric signal indicative of the movement of the guide posts 5A and 5B from one of the retracted and operative positions to the other of the retracted and operative positions or, if the case permits, in response to an electric signal indicative of the selective loading and unloading of the tape cassette 6. Moreover, the drive mechanism for the guide posts 5A and 5B employable in the practice of the present invention may be of any known construction and design and, therefore, the drive mechanism hereinafter described in association with the linkage system is only for the purpose of illustration.

Figure 5:
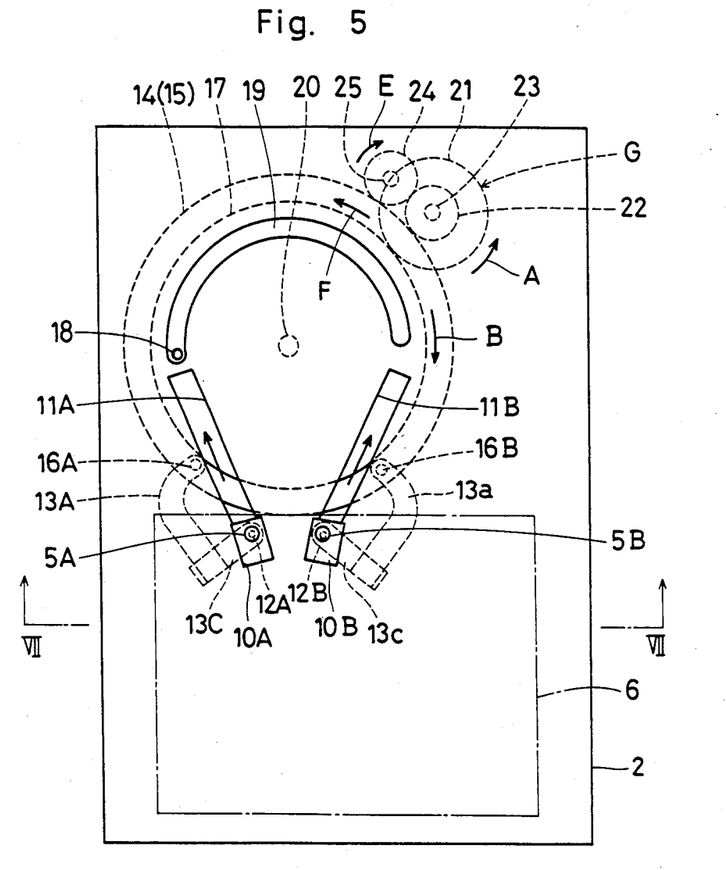
FIG. 5 is a schematic top plan view, showing a linkage system between a drive mechanism for guide posts and the movable shroud, with said guide posts shown as held at a retracted positions.
Figure 6:
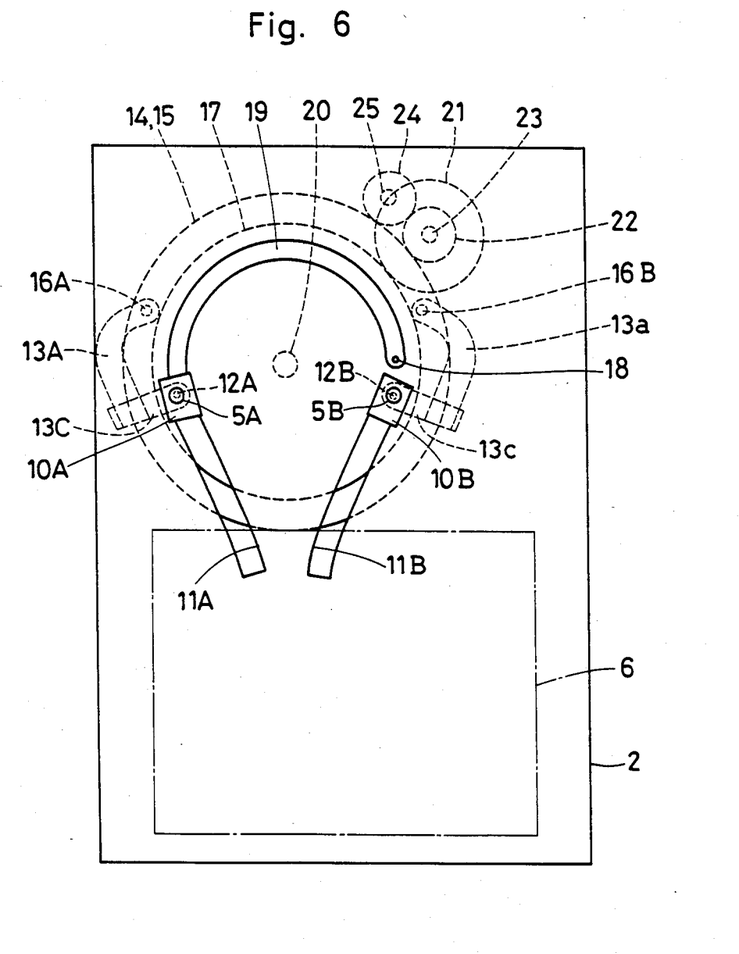
FIG. 6 is a view similar to FIG. 5, showing the condition in which the guide posts are moved to the operative position.

Referring now to FIGS. 5 to 7, the guide posts 5B and 5B are shown as rigidly mounted on respective pedestals 10A and 10B. These pedestals 10A and 10B are in turn slidably received in respective guide grooves 11A and 11B defined in the base plate 2 for guiding the movement of the associated pedestals 10A and 10B and, hence, that of the guide posts 5A and 5B, between the retracted position, as shown in FIG. 5, towards the operative position as shown in FIG. 6. The guide grooves 11A and 11B are spaced a minimum distance from each other where the guide posts 5A and 5B assume the retracted position and a maximum distance from each other where the guide posts 5A and 5B assume the operative position, substantially intermediate portions of which extend so as to diverge away from each other in a direction towards the operative position for the guide posts 5A and 5B.

The drive mechanism comprises a drive gear assembly G comprised of coaxial large and small diameter gears 21 and 22 mounted one above the other on a drive shaft 23 for rotation together therewith. The drive shaft 23 may be a drive shaft of an electrically operated motor, or it may be drivingly connected with an electrically operated motor through any suitable transmission system.

Constantly operatively meshed with these gears 21 and 22 are first and second geared wheels 17 and 14 that are coaxially rotatably mounted on a common support shaft 20 upstanding from an auxiliary plate 26 positioned below the base plate 2. It will readily be seen that, during the rotation of the gear assembly G in one of the opposite directions about the drive shaft 23, for example, in a direction shown by the arrow A in FIG. 5, the first and second geared wheels 17 and 14 are driven about the support shaft 20 in the same direction with respect to each other and in a direction shown by B.

Figure 7:
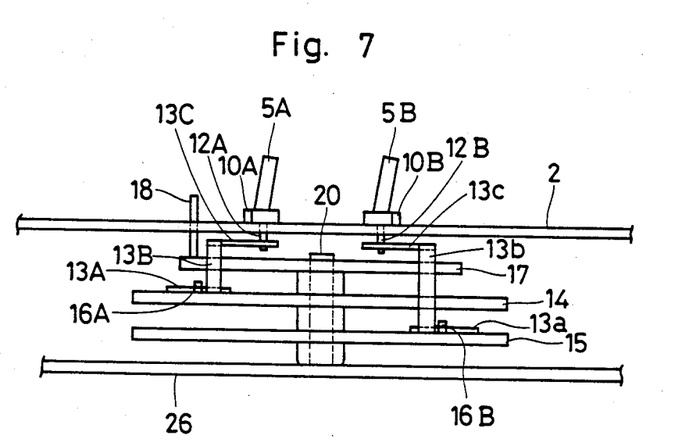
FIG. 7 is a schematic cross sectional view taken along the line VII—VII in FIG. 5.

A third geared wheel 15 of a diameter equal to that of the second geared wheel 14 is rotatably mounted on the support shaft 20 and positioned between the second geared wheel 14 and the auxiliary plate 2 as best shown in FIG. 7.

The second geared wheel 14 and the third geared wheel 15 are operatively coupled with the pedestals 10A and 10B, respectively, in a manner which will now be described. The second geared wheel 14 carries a lower link 13A of a shape generally similar to the shape of an inverted figure "J" having one end pivotally connected to the second geared wheel 14 through a connecting pin 16A, the other end of which link 13A is connected, or integrally formed with a leg 13B upwardly extending at right angles to the second geared wheel 14. The leg 13B is in turn connected or integrally formed with an upper link 13C having one end remote from the leg 13B pivotally coupled with the associated pedestal 10A by means of a downwardly extending connecting pin 12A. The link assembly including the lower link 13A, the leg 13B and the upper link 13C is so designed and so operable that the rotation of the second geared wheel 14 can result in the movement of the pedestal 10A and, hence, that of the guide post 5A, along the respective guide groove 11A.

Similarly, the third geared wheel 15 carries a lower link 13a of a shape generally similar to the shape of an inverted figure "J" having one end pivotally connected to the third geared wheel 15 through a connecting pin 16B, the other end of which link 13a is connected or integrally formed with a leg 13b upwardly extending at right angles to the third geared wheel 15. The leg 13b is in turn connected or integrally formed with an upper link 13c having one end remote from the leg 13b pivotally coupled with the associated pedestal 10B by means of a downwardly extending connecting pin 12B. This link assembly including the lower link 13a, the leg 13b and the upper link 13c is also so designed and so operable that the rotation of the third geared wheel 15 can result in the movement of the pedestal 10B and, hence, that of the guide post 5B, along the respective guide groove 11B.

For driving the third geared wheel 15, in a direction counter to the direction of rotation of the second geared wheel 14, a gear 24 identical in size and design with the gear 22 is rotatably supported by a support shaft 25 while constantly meshed with the gear 22 on the one hand and with the third geared wheel 15 on the other hand as best shown in FIGS. 5 and 6.

In addition to the first geared wheel 17, the linkage system comprises a guide pin 18 rigidly mounted on the first geared wheel 17 so as to extend upwards at right angles thereto through an arcuate guide slot 19 defined in the base plate 2. A free end of the guide pin 18 remote from the first geared wheel 17 and positioned above the base plate 2 is rotatably engaged in an engagement hole 905 defined in the engagement lug 904 integral with the movable shroud 902 as shown in FIGS. 1 to 4. The guide slot 19 within which the guide pin 18 moves extends exteriorly of the enclosure X with respect to the cylindrical drum assembly 1 so as to follow the curvature of the curved wall 901a of the stationary shroud 901 as shown in FIGS. 1 to 4.

The system embodying the present invention as hereinbefore fully described with reference to FIGS. 1 to 7 operates in the following manner. The condition shown in FIGS. 2 and 5 illustrates that the length of magnetic tape 4 has not been drawn out from the tape cassette 6 and not only are the guide posts 5A and 5B held in the retracted position, but also the movable shroud 902 is held in the closed position. Starting from this condition, and assuming that the gear assembly G is driven in the direction shown by A in FIG. 5, the second and third geared wheels 14 and 15 are driven about the support shaft 20 in the opposite directions B and F with respect to each other while the first geared wheel 17 is driven in the same direction as the direction of rotation of the second geared wheel 14. As hereinbefore described, the gears 21 and 22 integral with each other drive the first and second gear wheel 17 and 14 whereas the gear 24 meshed with the gear 22 drives the third geared wheel 15.

As the first geared wheel 17 is so rotated clockwise about the support shaft 20 as viewed in FIG. 5, the guide pin 18 revolves about the support shaft 20 while moving within the guide slot 19 defined in the base plate 2, accompanied by the rotation of the movable shroud 902 about the connecting pin 903 in the direction C shown in FIG. 3. In this way, the movable shroud 902 is moved from the closed position towards the opened position with the operative surface area of the cylindrical drum assembly 1 consequently progressively exposed to the outside.

Simultaneously therewith, the rotation of the second and third geared wheels 14 and 15 in the opposite directions B and F with respect to each other about the support shaft 20 results in the movement of the pedestals 10A and 10B and, hence, the guide posts 5A and 5B rigidly mounted thereon, respective from the retracted position towards the operative position while guided along the associated guide grooves 11A and 11B. As can readily be understood from FIGS. 5 and 6, as each of the second and third geared wheels 14 and 15 is rotated in the specific direction B or F in the manner as hereinbefore described, the associated link assembly including the lower link 13A or 13a, the leg 13B or 13b and the upper link 13C or 13c pivots about the connecting pin 16A or 16B while pulling the associated pedestal 10A or 10B along the guide groove 11A or 11B, respectively. Therefore, the rotation of the second and third geared wheels 14 and 15 results in the movement of the guide posts 5A and 5B from the retracted position towards the operative position as hereinabove described.

Simultaneously, or substantially simultaneously, with the arrival of the movable shroud 902 at the opened position, the guide posts 5A and 5B are brought to the operative position, and this condition is clearly shown in FIGS. 4 and 6. As hereinbefore described, simultaneously with the arrival of the guide posts 5A and 5B at the operative position, the length of magnetic tape 4 drawn out from the tape cassette 6 is turned around the cylindrical drum assembly 1 so as to contact the operative surface area thereof in readiness for the information recording or reproduction.

It is to be noted that the angular distance over which the engagement pin 18 is moved, that is, the angle of rotation of the movable shroud 902 between the closed position and the opened position about the connecting pin 903, as well as the distance over which each of the guide posts 5A and 5B is moved between the retracted position and the operative position, can be fixed to respective predetermined value by selecting the number of teeth of each of the first to third geared wheels 17, 14 and 15 in consideration of design parameters required for a particular magnetic tape recording and/or reproducing apparatus embodying the present invention.

When the motor is reversed to drive the gear assembly G in a direction counter to the direction A shown in FIG. 5, the various movable component parts operate in a manner reverse to that described hereinabove and the movable shroud 902 and the guide posts 5A and 5B are respectively returned to the closed position and the retracted position.

Although the present invention has fully been described in connection with the preferred embodiment thereof with reference to the accompanying drawings, it is to be noted that various changes and modifications are apparent to those skilled in the art upon the reading of this specification. By way of example, although in the foregoing description the enclosure X has been described as comprised of the stationary shroud and the movable shroud supported on the stationary shroud for movement between the closed and opened positions, the enclosure X may comprise a single cap structure. Where the single cap structure is employed, the linkage system may be so designed as to selectively lift and lower the cap structure in a direction generally perpendicular to the base plate in response to the movement of the guide posts from the retracted position towards the operative position and from the operative position back towards the retracted position, respectively. The entire cylindrical drum assembly could be exposed to the outside when the single cap structure is lifted.

In addition, instead of the movable shroud rotatably connected with the stationary shroud, the movable shroud may be connected to the stationary shroud by the use of one or two hinges.

Moreover, the enclosure may comprises a stationary shroud and a roll-up curtain which, when the operative surface area of the cylindrical drum assembly is desired to be exposed, rolls up in a manner similar to a coiled leaf-spring. In this case, the stationary shroud may comprises a curved wall and a circular top plate mounted thereon or integrally formed therewith.

Accordingly, such changes and modifications are to be construed as included within the true scope of the present invention as defined by the appended claims, unless they depart therefrom.

What is claimed is:

1. A magnetic tape recording and/or reproducing apparatus which comprises:

a cylindrical drum assembly including a stationary drum rigidly mounted on a base plate, a rotary drum mounted atop the stationary drum, and at least one magnetic recording and/or reproducing head carried by the rotary drum for rotation together therewith;

means supported for movement between retracted and operative positions and operable to turn a length of magnetic tape, drawn out from a tape container when said means is moved out of the retracted position, around a portion of the cylindrical drum assembly when said means is moved to the operative position;

a protective enclosure enclosing the cylindrical drum assembly; and a gating means operable to open the protective enclosure, when said means for turning the length of magnetic tape around that portion of the cylindrical drum assembly approaches the operative position, to permit at least said portion of the cylindrical drum assembly to be exposed outside of the protective enclosure, and also to close the protective enclosure when said means for turning the length of magnetic tape moves away from the operative position towards the retracted position.

2. The apparatus as claimed in claim 1, wherein said gating means is operatively coupled with said means for turning the length of magnetic tape, whereby said protective enclosure is opened in response to said means for turning the length of magnetic tape moving from the retracted position to the operative position, but is closed in response to said means for turning the length of magnetic tape moving from the operative position to the retracted position.

3. The apparatus as claimed in claim 1, wherein said protective enclosure comprises a stationary shroud rigidly mounted on the base plate so as to cover the remaining portion of the cylindrical drum assembly, and a movable shroud supported for movement between closed and opened positions, said portion of the cylindrical drum assembly being exposed to the outside when said movable shroud is moved by said gating means to the opened position.

4. The apparatus as claimed in claim 3, wherein said gating means is operatively coupled with said means for turning the length of magnetic tape, whereby said protective enclosure is opened in response to said means for turning the length of magnetic tape moving from the retracted position to the operative position, but is closed in response to said means for turning the length of magnetic tape moving from the operative position to the retracted position.

5. The apparatus as claimed in claim 3, wherein said gating means comprises a drive unit operable to move the movable shroud from the closed position towards the opened position in response to the movement of said means for turning the length of magnetic tape from the retracted position towards the operative position, and also to move the movable shroud from the opened position in response to the movement of said means for turning the length of magnetic tape from the operative position back towards the retracted position.

6. The apparatus as claimed in claim 3, wherein said means for turning the length of magnetic tape comprises first and second spaced apart guide posts supported for movement between the retracted and operative positions and operable to draw the length of magnetic tape out from the tape container as said guide posts are moved from the retracted position towards the operative position, guide means provided in the base plate for guiding the movement of the guide posts between the retracted and operative positions, a drive mechanism including geared wheels, one for each said guide post, supported in coaxial relationship with each other for rotation in opposite directions with respect to each other, and respective motion translators for translating the rotary motion of said geared wheels to the associated guide posts to move said guide posts between said retracted and operative positions, and wherein said gating means comprises a geared gating wheel drivingly coupled with said drive mechanism and linked with said movable shroud.

7. The apparatus as claimed in claim 6, wherein said gating wheel is supported in coaxial relationship with any one of said geared wheels and is drivingly coupled with said movable shroud through a connecting pin having one end rigidly mounted on the gating wheel and the other end engaged with said movable shroud.

* * * * *